United States Patent
Lemke (12)

(10) Patent No.: US 6,748,403 B1
(45) Date of Patent: Jun. 8, 2004

(54) METHOD AND APPARATUS FOR PRESERVING CHANGES TO DATA

(75) Inventor: Steven C. Lemke, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 0 days.

(21) Appl. No.: 09/483,382

(22) Filed: Jan. 13, 2000

(51) Int. Cl.$^7$ .............................................. G06F 17/30
(52) U.S. Cl. ........................ 707/202; 709/248; 709/217
(58) Field of Search ................................ 707/200, 201, 707/202; 713/400; 709/248, 217

(56) References Cited

U.S. PATENT DOCUMENTS

| | | | |
|---|---|---|---|
| 5,442,633 A | 8/1995 | Perkins et al. | 370/94.1 |
| 5,481,721 A | 1/1996 | Serlet et al. | 395/700 |
| 5,673,322 A | 9/1997 | Pepe et al. | 380/49 |
| 5,742,668 A | 4/1998 | Pepe et al. | 379/58 |
| 5,742,905 A | 4/1998 | Pepe et al. | 455/461 |
| 5,835,061 A | 11/1998 | Stewart | 342/457 |
| 5,903,898 A | 5/1999 | Cohen et al. | |
| 5,991,771 A * | 11/1999 | Falls et al. | 707/202 |
| 6,088,706 A * | 7/2000 | Hild | 707/202 |
| 6,205,448 B1 * | 3/2001 | Kruglikov et al. | 707/200 |
| 6,212,529 B1 * | 4/2001 | Boothby et al. | 707/201 |
| 6,247,135 B1 * | 6/2001 | Feague | 713/400 |
| 6,393,434 B1 * | 5/2002 | Huang et al. | 707/200 |
| 6,505,214 B1 * | 1/2003 | Sherman et al. | 707/201 |

* cited by examiner

Primary Examiner—Nabil El-Hady
Assistant Examiner—Jungwon Chang
(74) Attorney, Agent, or Firm—Marcel K. Bingham; Hickman Palermo Truong & Becker LLP

(57) ABSTRACT

Handheld computers, e.g. a Palm® Connected Organizer, typically use volatile memory such as random access memory (RAM) to store user data. If the volatile memory of the handheld computer were lost before the data in it is synchronized with the user's computer, then the user's changes would be lost. In order to preserve the changes, records of changes made on the handheld computer can be stored in a non-volatile memory on the handheld computer and/or transmitted over a wireless communication channel to a computer. This computer may house multiple users' data. After a failure of the handheld computer's memory, the contents of the handheld computer memory can be reconstructed using the most recent copy of the data on the user's computer and the records of changes in the non-volatile memory of the handheld computer and/or the computer that is receiving change records over the wireless communication channel. A number of techniques may be employed to control costs associated with using the wireless communication channel such as adding the change records to other packets. Also, rules and schedules can control the use of the wireless communication channel.

27 Claims, 4 Drawing Sheets

METHOD AND APPARATUS FOR PRESERVING CHANGES TO DATA

BACKGROUND OF THE INVENTION

1. Field of the Invention

This invention relates to the field of handheld computers. In particular, the invention relates to preserving changes made to data on handheld computers in the event of a data loss on the handheld computer.

2. Description of the Related Art

Handheld computers such as the Palm® Connected Organizer, from 3Com Corporation, Santa Clara, Calif., are capable of storing personal contact information and synchronizing that information with data in a program on another computer. For example, the date book program on the Palm® could be synchronized with a Microsoft Outlook™ calendar on the user's desktop computer.

The synchronization process is more than a backup of the handheld computer. Any changes to the data on the handheld computer are transferred into a corresponding program on the desktop computer and vice versa. For example, if the user adds an appointment on the handheld computer, then during the next synchronization process, that note will become available on the desktop computer in the appropriate program, e.g. Outlook. However, changes to the data are lost if the handheld computer loses power.

Systems and processes such as the FormLogic client/server system have been developed for synchronization of mobile clients with enterprise servers, e.g. U.S. Pat, No. 5,857,201, "Enterprise Connectivity to Handheld Devices", Gerald V. Wright, et. al. However, the FormLogic system is a synchronization system and does not handle the problem caused by loss of data on the mobile clients.

The previous techniques do not allow a handheld computer to maintain records of changes between synchronization processes. Accordingly, what is needed is an improved method of storing changes between synchronization processes on a handheld computer.

SUMMARY OF THE INVENTION

Handheld computers, e.g. a Palm® Connected Organizer, typically use volatile memory such as random access memory (RAM) to store user data. If the volatile memory of the handheld computer were lost before the data in it is synchronized with the user's computer, then the user's changes would be lost. To address this problem, a system and method for preserving the changes made to data on a handheld computer is described.

By storing records of changes made on the handheld computer in a non-volatile memory on the handheld computer and/or transmitting the changes over a wireless communication channel to a computer, the changes can be preserved.

After a failure of the handheld computer's memory, the contents of the handheld computer memory can be reconstructed using the most recent copy of the data on the user's computer and the records of changes in the non-volatile memory of the handheld computer and/or the computer that is receiving change records over the wireless communication channel. For example, if the user last synchronized with her/his computer a month ago, that copy of the data from the handheld computer can be reloaded onto the handheld computer and then brought up to date using the change records. In some embodiments, a wireless communication channel is not used, in these embodiments, the change records are stored in the non-volatile memory of the handheld computer.

A number of techniques may be employed to control costs associated with using the wireless communication channel such as adding the change records to other packets. For example, if the handheld computer was preparing a packet for transmission, change records could be added to packet without incurring significant costs.

Also, rules and schedules can control the use of the wireless communication channel. For example, changes could be transmitted only when the non-volatile memory is approaching a set capacity, e.g. 80% full. Also, the change records could be selectively transmitted, e.g. only changes to appointments are transmitted, but not changes to contacts.

DETAILED DESCRIPTION

Handheld computers such as the Palm® Connected Organizer, from 3Com Corporation, Santa Clara, Calif., have become increasingly popular tools. A typical handheld computer replaces not only the functions of a Day Runner™, or planner, but can offer additional features such as wireless messaging and document creation.

The synchronization features of handheld computers serve several purposes. One purpose is to ensure that a computer based personal information manager (PIM) is kept up to date with the handheld computer, and vice versa. The other is to provide a back up of the data on the handheld computer in case of a data loss. This is important because unlike computers that typically have reliable storage such as hard drives, handheld computers, due to their small size, typically use random access memory, or more generally some type of volatile memory, to store data instead of hard drives.

This makes the handheld computers more susceptible to data loss in the event of a power loss, or other failure, causing the loss of data in the volatile memory. If a user of a handheld computer does not regularly synchronize her/his handheld with her/his computer, changes made on the handheld between the time of the last synchronization and the loss of the data in the volatile memory will not be preserved.

Embodiments of the invention provide solutions to this problem through the use of a non-volatile memory on the handheld computer and/or a wireless communication channel to a remote computer to record changes to the data between synchronization processes. When there is a loss of data to the volatile memory on the handheld computer, these change records can be used in conjunction with the out of date copy of the data on the user's computer to reconstruct the memory of the handheld computer.

The invention will be described as follows. First, a system including one embodiment of the invention will be discussed. Then detailed process flow diagrams will be considered to explain how some embodiments of the invention preserve changes to data on a handheld computer.

A. System Overview

Figure 1:
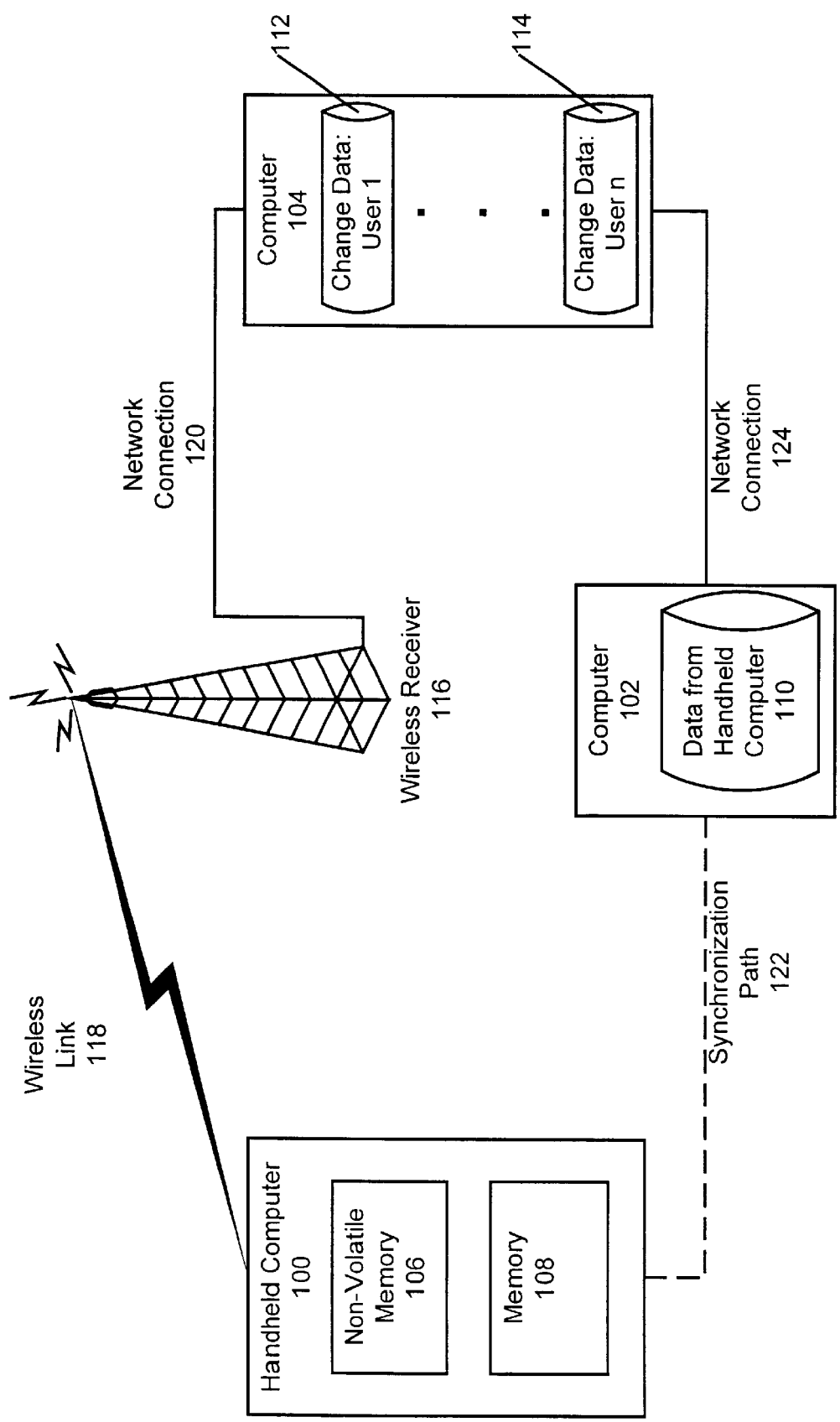
FIG. 1 illustrates a system for storing changes made on a handheld computer between synchronization processes according to some embodiments of the invention.

FIG. 1 illustrates a system for storing changes made on a handheld computer between synchronization processes according to some embodiments of the invention. FIG. 1 shows a handheld computer that is capable of using both a non-volatile memory and a wireless communication channel to preserve changes to data. Some embodiments of the invention use only a non-volatile memory on the handheld computer.

The following paragraph lists the elements of FIG. 1 and their interconnections. FIG. 1 includes a handheld computer 100, a computer 102, a computer 104, and a wireless receiver system 116. The handheld computer 100 includes a non-volatile memory 106 and a memory 108. The computer 102 includes a data from the handheld computer 110. The computer 104 includes a change data for user one 112 and a change data for a user n 114. The handheld computer 100 is capable of communication with the computer 102 over a synchronization path 122. The computer 102 is capable of communication with the computer 104 over a network connection 124. The handheld computer 100 is capable of communication with the wireless receiver system 116 over a wireless link 118. The wireless receiver system 116 is capable of communication with the computer 104 over a network connection 120.

The following describes the uses of the elements of FIG. 1. The handheld computer 100 is a handheld computer such as a Palm® Connected Organizer, a Windows CE™ organizer, or some other type of handheld computer that allows users to modify data on the handheld computer. A handheld computer is a computer, with memory and a processor, designed to be small enough to be operated while in one hand. Handheld computers are also sometimes referred to as personal digital assistants (PDAs) or palmtops The handheld computer 100 can store programs and data in the memory 108. Programs are one or more instructions for execution by a processor. For example, the memory 108 might include an address book, or contacts, program, as well as contact data, e.g. "John Doe, 12 Main Street, Anytown, USA, 12345", etc. In some embodiments, some programs on the handheld computer 100 are stored in a read-only memory (ROM) and/or a non-volatile memory, e.g. flash memory. For example, if the handheld computer 100 is a Palm Connected Organizer, the operating system and some basic programs are stored in ROM and/or the memory 108 to ensure their availability in the event that the handheld computer 100 is reset.

Because of the high cost and the slow speed of most forms of non-volatile memory 106 such as flash memory, typically the non-volatile memory 106 will be significantly smaller in size than the memory 108. Further, for these same reasons, the non-volatile memory 106 will not be used to store frequently changing data. However, flash memory can be used to provide a moderate amount of non-volatile storage space for a handheld computer. Instead of storing whole programs or entire files, embodiments of the invention use the non-volatile memory 106 to store a record of changes the user makes, see below for a discussion of change records.

Periodically, the change data can be transmitted over the wireless link 118 for storage on the computer 104. The wireless link can be a radio frequency link, a cellular link, a satellite link, and/or some other type of wireless link. In this example, the computer 104 may store the change data for multiple users, e.g. the change data user for users one to n 112–114. Once the change data has been transmitted successfully to the computer 104, it can be removed from the non-volatile memory 106. The handheld computer 100 could be a Palm VII with access to Palm.Net.

Because of the relatively high costs of using the wireless communication channel provided by the wireless link 118, it may not be desirable to always transmit change records from the non-volatile memory 106 to the computer 104. For further discussion on how the costs of using the wireless link 118 can be controlled, see "Limiting Usage of the Wireless Communication Channel" below. Some embodiments of the invention may allow the wireless link 118 to be completely disabled or may omit the ability to use a wireless link entirely.

In some embodiments, the computer 104 is coupled to the wireless receiver system 116 by a network connection 120. Typically, the network connection 120 is a local area network (LAN), but it can also be some other type of connection such as an Internet connection, a dial-up connection, a serial line connection, and/or some other type of network connection.

The network connection 120 allows the wireless receiver system 116 to separate out change record additions to packets destined for different computers. For example, a query to check a user's Palm.Net™ mailbox might have a change record attached to the query packet. The query packet has one destination while the change record should be routed to the computer 104. The wireless receiver system 116 may include computers and/or routers for separating the packet into its components and routing the query portion to the appropriate location while routing the change record portion to the computer 104.

The computer 104 may be a server computer, a personal computer, a cluster of computers, and/or some other type of computer. In this example, the computer 104 can store change records for multiple users. The change records (e.g. the change data for user one 112) can be accessed via the network connection 124 from the user's computer 102. Typically, the network connection 124 is an Internet connection, but it can also be some other type of connection such as a local area net connection, a dial-up connection, a serial line connection, and/or some other type of network connection. A variety of security measures can be used to protect access to the change records on the computer 104. In one embodiment, the user provides her/his username and password for the wireless service when accessing her/his change data from the computer 104.

The computer 102 is typically a desktop computer, though it could be some other type of computer such as a thin client computer, a set top box, a Java™ terminal, a server computer, a laptop computer, and/or some other type of computer. In this example, the computer 102 is the user's office desktop computer. The computer 102 includes a data from the handheld computer 110. This data is also referred to as a copy of the data. That is because the data on the computer 102 after synchronization includes a copy of the data on the handheld computer 110.

On a periodic basis, the handheld computer 100 and the computer 102 are synchronized via the synchronization path 122. The synchronization path can be a serial connection, an infra-red connection, a dial-up connection, and/or some other type of synchronization path. As changes are made on the handheld computer 100 without synchronizing the data from the handheld computer 110 to the data in the memory 108, the loss in the event of a failure of the memory 108 becomes more severe. In the event of a failure, the changes to the data can be restored using the change records in the non-volatile memory 106 and/or the computer 104. This is in contrast to simply restoring the handheld computer 100 with a backup, e.g. the copy of the data on the computer 102, in that there is also a recovery of changes made to the data since the time of the backup. In some embodiments, the user may be able to select which change records to apply.

However, once the data in the handheld computer 100 is synchronized with the data on the computer 102 using the synchronization path, the contents of the non-volatile memory 106 and/or the corresponding change data (e.g. the change data for user one 112) on the computer 104 can be purged.

The process of recording change data will be discussed next. Then, the synchronization process used by embodiments of the invention will be discussed. Finally, the process of restoring a handheld computer after a failure of memory will be considered.

B. Recording Changes

Figure 2:
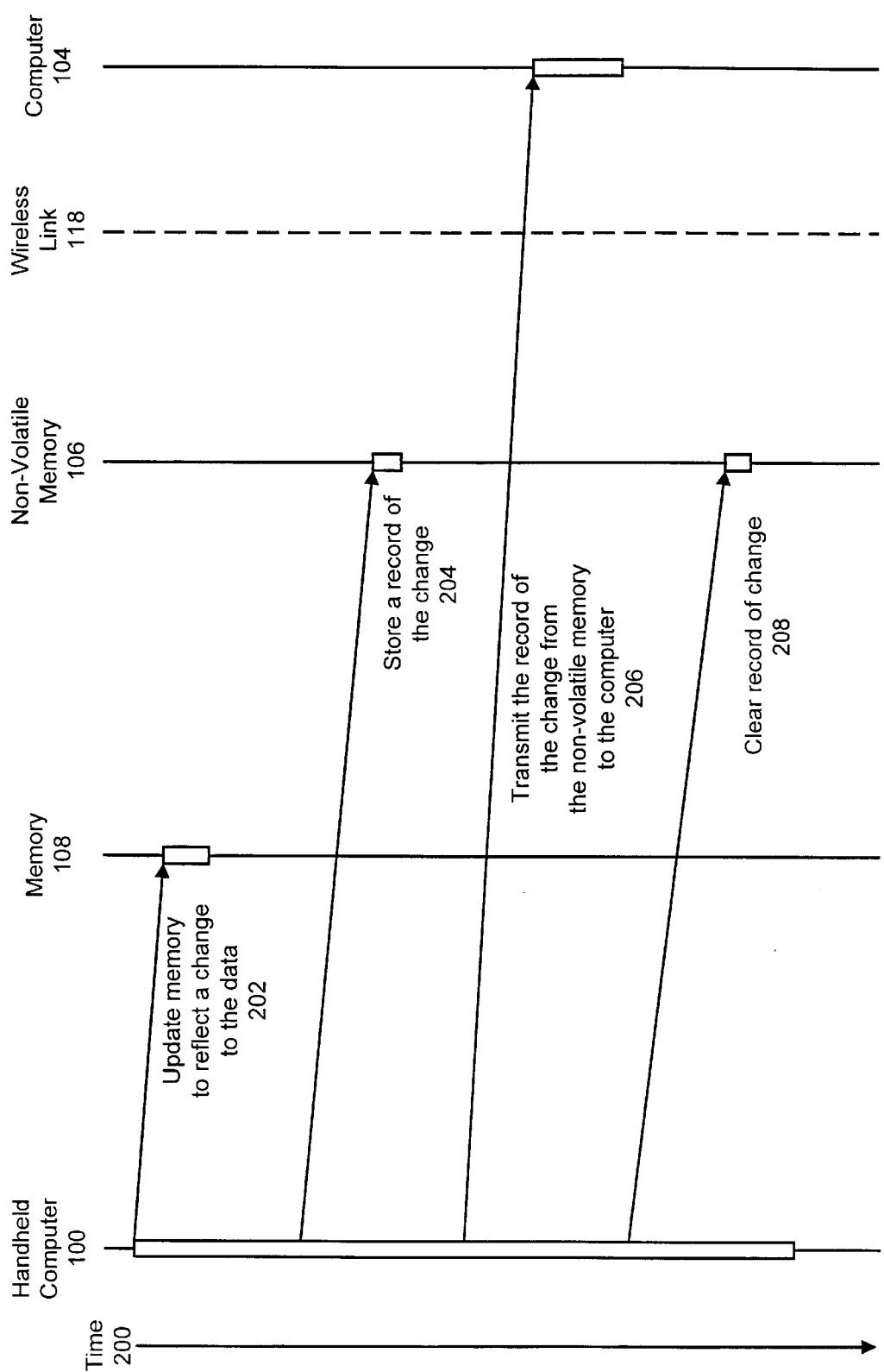
FIG. 2 is a process flow diagram for storing changes made on a handheld computer to a non-volatile memory and/or a wirelessly connected computer.

FIG. 2 is a process flow diagram for storing changes made on a handheld computer to a non-volatile memory and/or a wirelessly connected computer. This could be used to preserve changes made on the handheld computer 100 in case of a data loss in the memory 108.

FIG. 2 is drawn using principles from the Unified Modeling Language. The flow of time is from earliest, top of FIG. 2, to latest, bottom of FIG. 2, as indicated by the arrow 200. Each of the participants in the process is shown as a narrow line with a thicker box indicating periods during which that participant is active in the process. Messages between participants are shown as directed lines from one participant to another.

From left to right, the participants are the handheld computer 100, the memory 108, the non-volatile memory 106, and the computer 104. The wireless link 118 is indicated as a dotted line between the non-volatile memory 106 and the computer 104.

The process will now be described in chronological order. First, at time 202, the memory 108 is updated to reflect a change to the data. This can include any modification to, addition to, and/or deletion from, the data in the memory 108. Examples of changes include adding a contact, deleting an event, rescheduling an event, changing a phone number for a contact, and/or other types of changes.

Next, at time 204, a record of the change can be stored in the non-volatile memory 106. Some embodiments of the invention may omit this step in preference for immediate transmission of a record of the change to the computer 104. This might be used if the handheld computer did not include a non-volatile memory 106 but supported a wireless link 118. This process may occur asynchronously from additional changes a user of the handheld computer 100 is making. For example, a queue could be used to hold change records for writing to the non-volatile memory. This can be used to maintain a high degree of performance for the handheld computer 100 given the relatively long latencies of several types of non-volatile memory such as flash memory. For further details on what is stored in the non-volatile memory and/or transmitted to the computer 104 see the discussion of change records below.

Next, at time 206, the record of the change is transmitted from the non-volatile memory to the computer 206 over the wireless link 118. This allows the amount of non-volatile memory 106 provided on the handheld to be very small relative to the size of the memory 108. This allows for the situation where a user synchronizes her/his handheld computer 100 extremely infrequently since the storage space for change records available on the computer 104 will exceed the size of the non-volatile memory typically. In order to reduce the costs associated with using the wireless communication channel provided by the wireless link 118, several limits and optimizations are used as discussed with limiting usage of the wireless communication channel below.

Finally, at time 208, the record of the change can be cleared from the non-volatile memory 106. In some embodiments, the non-volatile memory 106 is actually erased, in other embodiments a memory map or other data structure is modified to allow the reuse of the portion of the non-volatile memory 106 occupied by the record of the change.

Thus, as shown, the change records may be stored in multiple locations. Typically the change records are in the non-volatile memory 106 of the handheld computer. However, some embodiments of the invention use the wireless link 118 to upload the change records to the computer 104.

Figure 4:
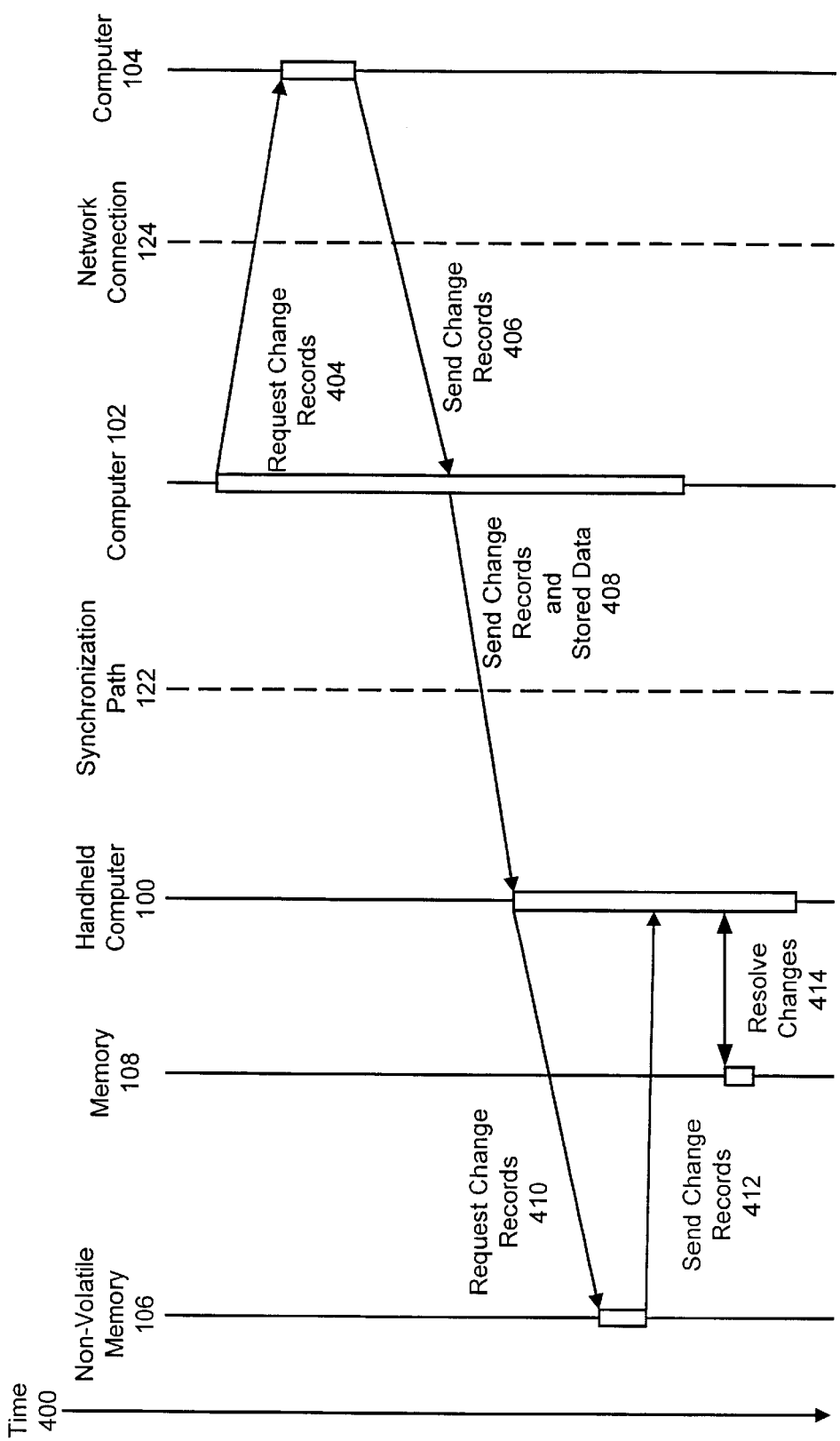
FIG. 4 is a process flow diagram for using the stored changes to restore a handheld computer.

Additionally, in some embodiments, the change records are routed from the computer 104 to the computer 102 after time 206, but prior to using the process of FIG. 4. These routed change records are not immediately incorporated into the data from the handheld computer 110 on the computer 102, but are held separately as change records in the computer 102. In these embodiments, the handheld computer can be said to be in communication with the computer 102 over the wireless link 118.

1. Change Records

Change records are data structures that describe the changes performed by a user on the handheld computer 100. Preferably, the changes are described at an application level rather than at a file level. This means that instead of storing an entire copy of all contacts, the change record records the specific change, or changes, to records and/or fields within contacts.

Thus, the change record will typically identify a file, or database, with changed information. The change record will also typically identify the record, or records, within the file that were changed. Then the change record will specify the changes to that record, or records. If appropriate the data may be compressed to save space in the non-volatile memory 106 and reduce transmissions over the wireless link 118. Table 1 shows several examples of a change record according to several formats. Many other formats can be employed. For example, in some embodiments, the change record may include the entire record, or the entire file, that was updated.

TABLE 1

| Change Record | Description |
| --- | --- |
| Contacts, ID = 123, Home Phone = 555-555-1212 | This change record shows a modification of record number 123 within the contacts. The modification is that the home phone field was set to "555-555-1212". |
| Contacts, ID = 123, 12 = 555-555-1212 | This is the same as the previous change; however, instead of using field names, a field number is used, twelve here. |
| CONT, 123, 12 = 555-555-1212 | This is the same as the previous changes; however, an even more compact notation is used. The file is specified using a code that uniquely identifies the file rather than the file name. |
| CONT, D, 124 | This change record describes the deletion of a record number 124 from the contacts file. |
| CONT, A, 1 = John Doe, 2 = 123 Main Street, 5 = Anytown, 6 = CA, 7 = 12345, | This change record describes the addition of a new record to the contacts file. |

2. Limiting Usage of the Wireless Communication Channel

The wireless communication channel provided by the wireless link 118 has relatively high costs, even compared to those for the non-volatile memory 106. Therefore, it may not be desirable to always, or immediately, transmit change records from the non-volatile memory 106 to the computer 104. There are two primary costs associated with the use of the wireless link 118: a per kilobyte (KB) transmission cost, e.g. $0.30/KB, and a power cost to the handheld computer 100. For example, the Palm VII™ organizer has a limited battery life especially when its wireless link is used.

Accordingly, embodiments of the invention may offer a number of options to limit these costs. One way to reduce the per packet costs is to add the change records to the end of packets the handheld computer 100 was about to send for another application. For example, if the user of the handheld computer 100 was preparing to request her/his stock quotes using the wireless link 118, some change records could be sent in the same packet.

For this example, a minimum packet size of 512 bytes is assumed. If the user has made a wireless request that is only 200 bytes, including any headers, the remaining 312 bytes of the packet would otherwise be unused. Accordingly, a portion of the remainder of the packet can be used to hold change records from the non-volatile memory 106.

Still other embodiments allow greater customization of when the wireless link is used. Such limits may include waiting to transmit over the wireless link 118 until the non-volatile memory is approaching capacity, e.g. 75% full. Other embodiments allow the user to limit the transmission to no more than Xbytes per time period, e.g. 1 KB a day, or only use the wireless link 118 for certain changes, e.g. contacts, notes, calendar, and tasks, but not for changes made in other applications. These types of limits not only reduce the packet transmission costs, but also conserve battery life.

Because of the high cost of the wireless link 118 relative to even the non-volatile memory 106, some embodiments of the invention may allow the wireless link 118 to be completely disabled or omit the ability to use a wireless link entirely. This may be desirable to cost conscious users who want to save money and/or battery life.

Also, in some embodiments, the change records may be updated on the computer 104 from any computer with internet access and a synchronization path. For example, an Internet kiosk with a cradle for the handheld computer 100 might be configured to accept change records from the handheld computer 100 for transmission to the computer 104.

C. Synchronizing

Figure 3:
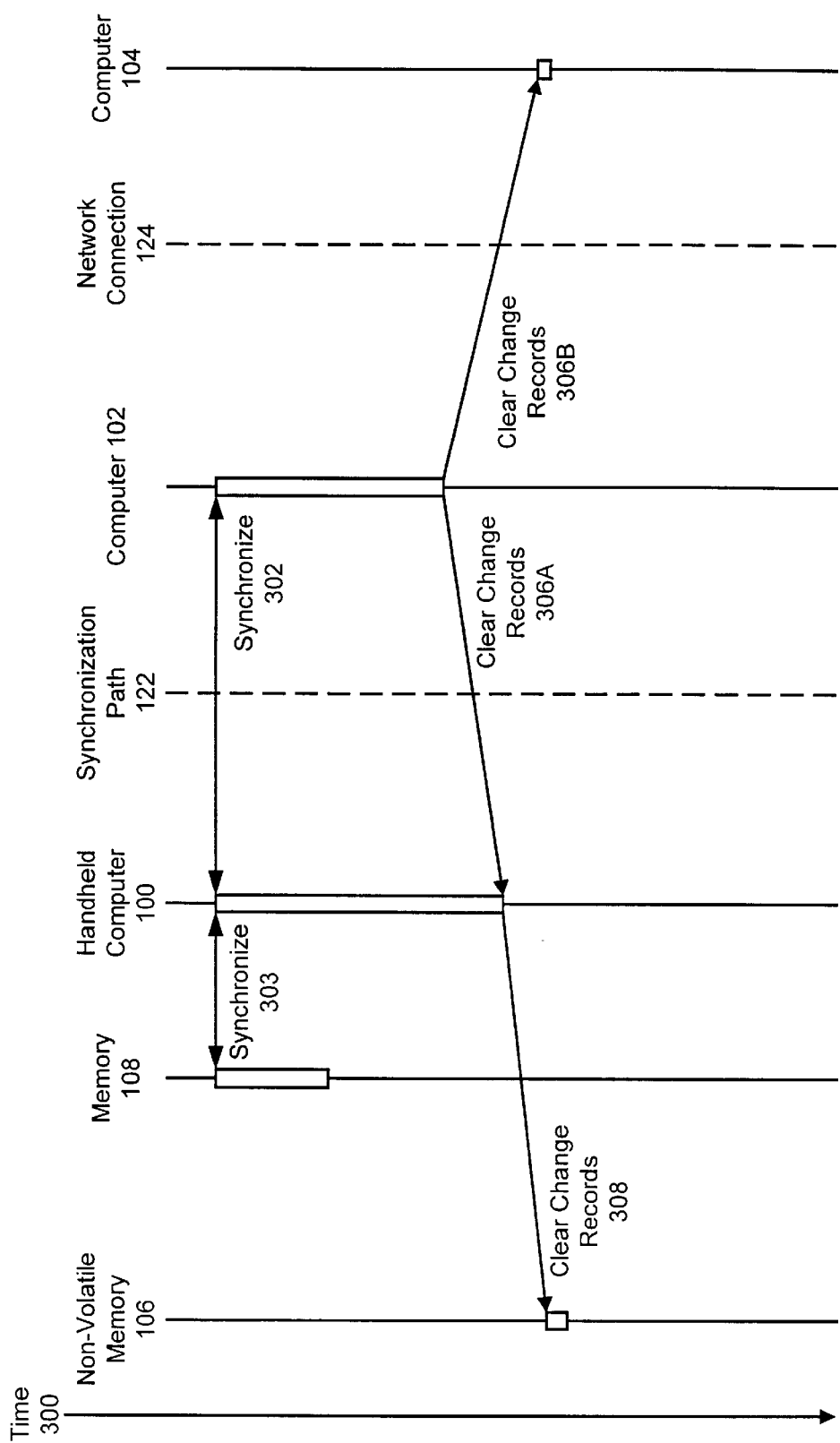
FIG. 3 is a process flow diagram for performing the synchronization process in conjunction with some embodiments of the invention.

FIG. 3 is a process flow diagram for performing the synchronization process in conjunction with some embodiments of the invention. This process allows change records on the handheld computer 100 and the computer 104 to be cleared after a synchronization occurs.

FIG. 3 is drawn using principles from the Unified Modeling Language. The flow of time is from earliest, top of FIG. 3, to latest, bottom of FIG. 3, as indicated by the arrow 300. Each of the participants in the process is shown as a narrow line with a thicker box indicating periods during which that participant is active in the process. Messages between participants are shown as directed lines from one participant to another.

From left to right, the participants are the non-volatile memory 106, the memory 108, the handheld computer 100, the computer 102, and the computer 104. The synchronization path 122 is indicated as a dotted line between the handheld computer 100 and the computer 102. The network connection 124 is indicated as a dotted line between the computer 102 and the computer 104.

The process will now be described in chronological order. First, at time 302 and time 303, the handheld computer 100 and the computer 102 are synchronized. This causes the data in the memory 108 to be synchronized with the data from the handheld computer 110. At this point the copy of the data (e.g. the data from the handheld computer 110) is all that would be needed to restore the handheld computer 100 in the event of a memory failure—at least until new changes are made on the handheld computer 100. For this reason, the change records in the non-volatile memory 106 and/or the computer 104 can now be cleared.

At time 306A–B, a message is sent from the computer 102 requesting that the change records be cleared from the handheld computer 100 and the computer 104. In other embodiments, the handheld computer 100 generates the request to the computer 104 or sends it with the next group of change records sent over the wireless link 118.

At time 308, the handheld computer 100 erases the change records from the non-volatile memory. In some embodiments, the records are not actually erased, but rather the space they occupy is marked for reuse.

Also, if the computer 104 has routed any change records to the computer 102, those change records on the computer 102 can be cleared after time 303.

D. Restoring Using Change Records

FIG. 4 is a process flow diagram for using the stored changes to restore a handheld computer. This could be used by the user of the handheld computer 100 to recover her/his changes after a loss of data to the memory 108 of the handheld computer 100.

FIG. 4 is drawn using principles from the Unified Modeling Language. The flow of time is from earliest, top of FIG. 4, to latest, bottom of FIG. 4, as indicated by the arrow 400.

From left to right, the participants are the non-volatile memory 106, the memory 108, the handheld computer 100, the computer 102, and the computer 104. The synchronization path 122 is indicated as a dotted line between the handheld computer 100 and the computer 102. The network connection 124 is indicated as a dotted line between the computer 102 and the computer 104.

The process will now be described in chronological order. The user can initiate the process of restoring her/his handheld from her/his computer 102. Once the process is initiated, at time 404, the change records are requested from the computer 104.

Next, at time 406, the computer 104 sends the change records to the computer 102. Then, at time 408, the change records are sent together with the data from the handheld computer 110 to the handheld computer 100. The data from the handheld computer 110 is out of date in that it does not reflect changes since the last synchronization that occurred on the handheld computer 100. Also, if change records are present on the computer 102, they can be sent at time 406 as well.

Next, at time 410, the handheld computer 100 requests the change records from the non-volatile memory 106. Then, at time 412, the change records are sent to the handheld computer 100.

Finally, at time 414, the changes are resolved in the memory 108. This involves applying the change records from the non-volatile memory 106 and/or the computer 104 to the copy of the data from the handheld computer 110.

In some embodiments of the invention, the reconciliation of the change records to the copy of the data from the handheld computer 110 occurs on the computer 102. In these embodiments, the change records stored in the non-volatile memory 106 are sent back to the computer 102. Then, the changes are resolved on the computer 102 and the updated version of the data from the handheld computer 110 is stored onto the memory 108 of the handheld computer. In other embodiments, the resolution of changes from the computer 104 is performed on the computer 102 before time 408 so that the data sent at time 408 is partially updated.

It may be the case that some change records can not be applied and/or that some change records may conflict with changes made to the data on the computer 102. Therefore while changes are being resolved, special handling may be afforded for certain situations. Some examples of these situations along with the approaches to handling the situations by various embodiments of the invention follow.

It may be the case that a change record refers to something that was deleted on the computer 102. For example, on the computer, a user might have deleted a contact. Later, before synchronizing, they might modify the same contact on the handheld. In this instance there would be a change record in the non-volatile memory 106 and/or the computer 104 for the modification.

In some instances, the copy of the data from the handheld computer 110 may no longer include the modified contact. In this case, the user can be notified of the inability to update the contact. Depending on the information stored with the change record, e.g. are names stored with change records for contacts, the notification may be more helpful.

In other instances, the copy of the data from the handheld computer 110 may still include the modified contact with an indication that the contact should be deleted. At this point, the user can be prompted as to which action to take: delete or modify. Other embodiments, allow the user to specify a default setting such as handheld computer 100 over writes computer 102; computer 102 over writes handheld computer 100; do nothing; and/or duplicate entries.

A similar problem arises when a record has been modified on both the handheld computer 100 and the computer 102. Again, the user can be prompted to as to which change to make or default settings can be used to resolve the conflict.

E. Alternative Embodiments

In some embodiments, the programs for maintaining records of changes on the handheld computer 100, the programs for synchronizing the handheld computer 100 and the computer 102, the programs for communicating over the wireless link 118, and the programs for recovering the handheld computer using the records of the changes are included in one or more computer usable media such as CD-ROMs, floppy disks, read only memory, and/or other media.

Some embodiments of the invention are included in an electromagnetic wave form. The electromagnetic wave form comprises information such as the programs on the computer 104 for receiving changes over the wireless communication channel and providing records of changes to another computer (e.g. the computer 102) to restore the handheld computer 100.

F. Conclusion

Accordingly, a method for preserving a change to data on a handheld computer has been described. This allows the recovery of changes made on the handheld computer even after the loss of memory to the handheld computer. Some embodiments of the invention include methods for using a non-volatile memory on the handheld computer and/or a wireless communication channel to store records of the changes made on the handheld computer.

The foregoing description of various embodiments of the invention has been presented for purposes of illustration and description. It is not intended to limit the invention to the precise forms disclosed. Many modifications and equivalent arrangements will be apparent.

What is claimed is:

1. A method of preserving a change to data on a handheld computer using a non-volatile memory and a first computer, the handheld computer including a volatile memory and the non-volatile memory, the volatile memory including the data, the first computer including a copy of the data, the copy of the data periodically being synchronized with the data on the handheld computer, the method comprising:

creating a new version of the data by updating the data in the volatile memory to reflect the change;

responsive to updating the data in the volatile memory to create the new version of the data, storing a record of the change to the data in the non-volatile memory;

wherein said record of change includes information for reconstructing the new version of the data based on the version of the data that existed prior to said change;

responsive to a loss of the data in the volatile memory, causing transfer of the copy of the data from the first computer to the volatile memory of the handheld computer; and after transferring the copy of the data from the first computer to the volatile memory of the handheld computer, using the record of the change in the non-volatile memory to reconstruct the new version of the data based on the data from the first computer.

2. The method of claim 1, wherein the handheld computer communicates using a wireless communication channel with a device external to the handheld computer, the method further comprising:

transmitting the record of the change to the data from the non-volatile memory to the first computer via the wireless communication channel to the device; and transferring the copy of the data and a copy of the record of change from the first computer to the volatile memory of the handheld computer.

3. The method of claim 2, wherein the handheld computer has packets to be transmitted, wherein the step of transmitting the record of the change to the data from the non-volatile memory via the wireless communication channel includes transmitting the packets, the method further including:

identifying a packet that
(a) is being sent from the handheld computer to the device external to the handheld computer to convey information unrelated to the change, and
(b) has sufficient unused space to store said record of change; and conveying the change to the first computer by piggybacking a copy of the record of change to the packet when the packet is sent to the device.

4. The method of claim 3, wherein the step of identifying or piggybacking is performed in response to a predetermined amount of usage of the non-volatile memory.

5. A computer-readable medium carrying one or more sequences of instructions which, when executed by one or more processors, causes the one or more processors to perform the method recited in claim 4.

6. A computer-readable medium carrying one or more sequences of instructions which, when executed by one or more processors, causes the one or more processors to perform the method recited in claim 2.

7. A particular handheld computer configured to carryout, as the handheld computer, the method recited in claim 2.

8. A computer-readable medium carrying one or more sequences of instructions which, when executed by one or more processors, causes the one or more processors to perform the method recited in claim 3.

9. A particular handheld computer configured to carryout, as the handheld computer, the method recited in claim 3.

10. A particular handheld computer configured to carryout, as the handheld computer, the method recited in claim 4.

11. The method of claim 1, wherein the data comprises one or more of a calendar entry, a contact list entry, a note entry and a to do list entry.

12. A computer-readable medium carrying one or more sequences of instructions which, when executed by one or more processors, causes the one or more processors to perform the method recited in claim 11.

13. A particular handheld computer configured to carryout, as the handheld computer, the method recited in claim 11.

14. A computer-readable medium carrying one or more sequences of instructions which, when executed by one or more processors, causes the one or more processors to perform the method recited in claim 1.

15. A particular handheld computer configured to carryout, as the handheld computer, the method recited in claim 1.

16. A method used for preserving a change to data on a handheld computer using a non-volatile memory, a first computer, and a communication channel, the handheld computer including a volatile memory and the non-volatile memory, the volatile memory including the data, the first computer including a copy of the data, the copy of the data periodically being synchronized with the data on the handheld computer, the communication channel supporting communication between the handheld computer and a device external to the handheld computer, and the handheld computer transmitting packets over the communication channel to the device, the method comprising:

creating a new version of the data by updating the data in the volatile memory to reflect the change;

responsive to updating the data in the volatile memory to create the new version of the data, storing a record of the change to the data in the non-volatile memory;

wherein said record of change includes information for reconstructing the new version of the data based on the version of the data that existed prior to said change;

identifying a packet that
(a) is being sent from the handheld computer to the device external to the handheld computer to convey information unrelated to the change, and
(b) has sufficient unused space to store said record of change; and conveying the change to the first computer by piggybacking a copy of the record of change to the packet when the packet is sent to the device; and responsive to a loss of the data in the volatile memory, restoring the data in the volatile memory to reflect the change based on the copy of the record of change from the external device, and the copy of the data stored on the first computer.

17. The method of claim 16, wherein said step of identifying or of piggybacking is performed in response to a predetermined amount of usage of the non-volatile memory.

18. A computer-readable medium carrying one or more sequences of instructions which, when executed by one or more processors, causes the one or more processors to perform the method recited in claim 17.

19. A particular handheld computer configured to carryout, as the handheld computer, the method recited in claim 17.

20. The method of claim 16, wherein the data comprises one or more of a calendar entry, a contact list entry, a note entry and a to do list entry.

21. A computer-readable medium carrying one or more sequences of instructions which, when executed by one or more processors, causes the one or more processors to perform the method recited in claim 20.

22. A particular handheld computer configured to carryout, as the handheld computer, the method recited in claim 20.

23. The method of claim 16, where said communication channel is a wireless communication channel.

24. A computer-readable medium carrying one or more sequences of instructions which, when executed by one or more processors, causes the one or more processors to perform the method recited in claim 23.

25. A particular handheld computer configured to carryout, as the handheld computer, the method recited in claim 23.

26. A computer-readable medium carrying one or more sequences of instructions which, when executed by one or more processors, causes the one or more processors to perform the method recited in claim 16.

27. A particular handheld computer configured to carryout, as the handheld computer, the method recited in claim 16.

* * * * *